US009482692B2

(12) United States Patent
Saito et al.

(10) Patent No.: US 9,482,692 B2
(45) Date of Patent: Nov. 1, 2016

(54) MAGNETIC FIELD VALUE MEASURING DEVICE AND METHOD FOR MEASURING MAGNETIC FIELD VALUE

(71) Applicants: AKITA UNIVERSITY, Akita-shi, Akita (JP); OSAKA UNIVERSITY, Suita-shi, Osaka (JP)

(72) Inventors: Hitoshi Saito, Akita (JP); Satoru Yoshimura, Akita (JP); Yukinori Kinoshita, Akita (JP); Hikaru Nomura, Suita (JP); Ryoichi Nakatani, Suita (JP)

(73) Assignees: AKITA UNIVERSITY, Akita-shi, Akita (JP); OSAKA UNIVERSITY, Suita-shi, Osaka (JP)

( * ) Notice: Subject to any disclaimer, the term of this patent is extended or adjusted under 35 U.S.C. 154(b) by 0 days.

(21) Appl. No.: 14/777,667

(22) PCT Filed: Mar. 28, 2014

(86) PCT No.: PCT/JP2014/059276
§ 371 (c)(1),
(2) Date: Sep. 16, 2015

(87) PCT Pub. No.: WO2014/157661
PCT Pub. Date: Oct. 2, 2014

(65) Prior Publication Data
US 2016/0109478 A1   Apr. 21, 2016

(30) Foreign Application Priority Data
Mar. 28, 2013  (JP) ................................. 2013-069762

(51) Int. Cl.
*G01Q 60/52* (2010.01)
*G01Q 60/56* (2010.01)
*G01Q 60/50* (2010.01)
*G01Q 60/54* (2010.01)

(52) U.S. Cl.
CPC .............. *G01Q 60/52* (2013.01); *G01Q 60/50* (2013.01); *G01Q 60/54* (2013.01); *G01Q 60/56* (2013.01)

(58) Field of Classification Search
None
See application file for complete search history.

(56) References Cited

U.S. PATENT DOCUMENTS 5,619,139 A *  4/1997  Holczer ................. B82Y 35/00
                                                    324/300
6,639,400 B2 * 10/2003  Abe ....................... B82Y 35/00
                                                    324/210

(Continued)

FOREIGN PATENT DOCUMENTS

JP   2000-275313 A   10/2000
JP   2003-065935 A    3/2003

(Continued)

OTHER PUBLICATIONS

Y. Kinoshita, et al; "Alternating magnetic force microscopy: proposal of absolute value measurement of magnetic field", Abstracts of the 37th Annual Conference on Magnetics in Japan, The Magnetics Society of Japan, Sep. 3, 2013, p. 110 (English Translation: Not Available—*Citation in ISR).

(Continued)

*Primary Examiner* — Michael Logie
(74) *Attorney, Agent, or Firm* — Ladas & Parry LLP

(57) ABSTRACT

A magnetic field measuring device including: a vibrational probe unit having a probe that includes one or more material(s) whose intensity of magnetization is proportionate to an external magnetic field, a mechanical vibration source for the probe; a vibration detector detecting a vibration frequency and amplitude of the probe; an alternating-current magnetic field generator applying to the probe an alternating-current magnetic field; a direct-current external magnetic field generator applying a direct-current external magnetic field to the probe; a frequency modulation detector detecting frequency modulation occurring to the mechanical vibration of the probe; a direct-current external magnetic field controller adjusting the intensity of the direct-current external magnetic field applied to the probe; and a direct-current magnetic field determination unit determining a value of the direct-current magnetic field originating from a specimen.

12 Claims, 6 Drawing Sheets

(56) References Cited

U.S. PATENT DOCUMENTS

| | | | | |
|---|---|---|---|---|
| 2002/0021515 A1* | 2/2002 | Abe | ................... | G11B 5/455 360/31 |
| 2002/0130658 A1* | 9/2002 | Abe | ................... | B82Y 35/00 324/210 |
| 2011/0030109 A1* | 2/2011 | Saito | ................... | B82Y 35/00 850/5 |
| 2014/0096293 A1* | 4/2014 | Kitano | ............... | B82Y 35/00 850/32 |
| 2014/0218016 A1* | 8/2014 | Saito | ................... | G01Q 30/04 324/228 |

FOREIGN PATENT DOCUMENTS

| | | |
|---|---|---|
| JP | 2013-002970 A | 1/2013 |
| WO | 2009/101991 A1 | 8/2009 |
| WO | 2012/029973 A1 | 3/2012 |

OTHER PUBLICATIONS

International Search Report mailed Jul. 1, 2014; PCT/JP2014/059276.

* cited by examiner

FIG. 3
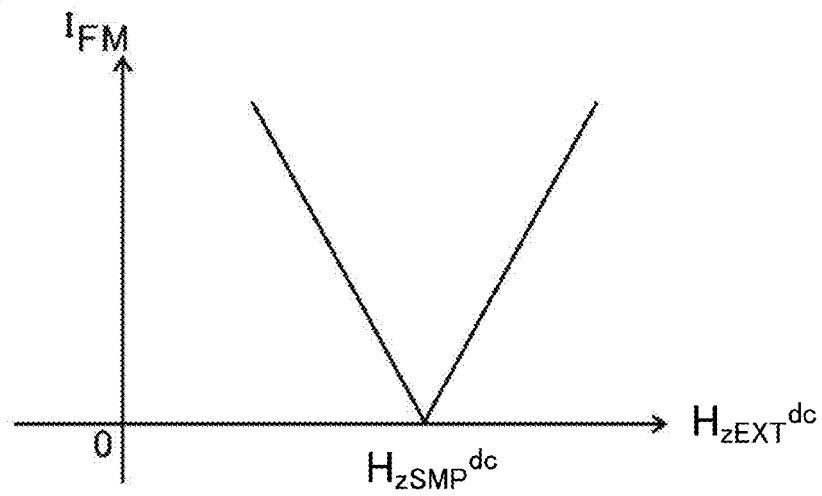
(A)
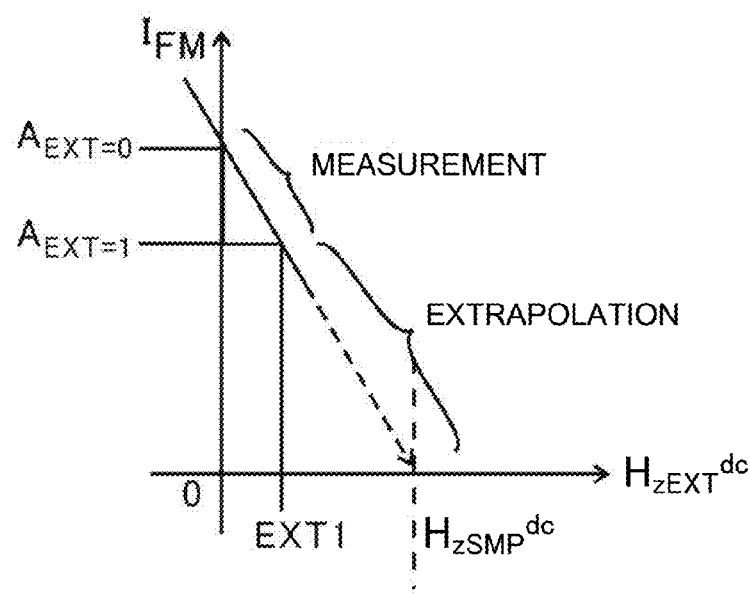
(B)

FIG. 6
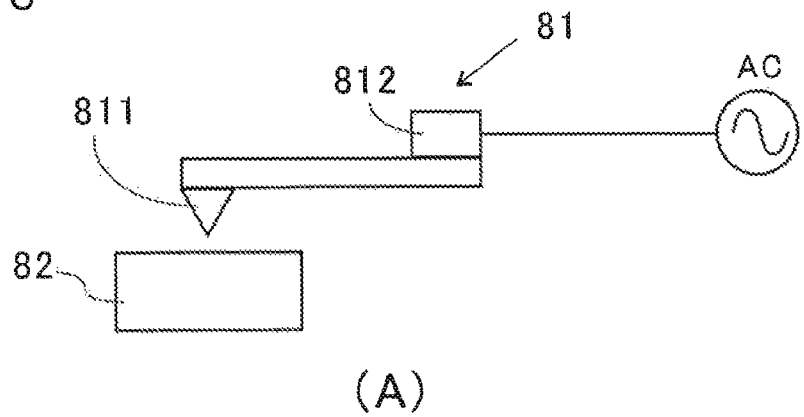
(A)
-Prior Art-
FIG. 6A
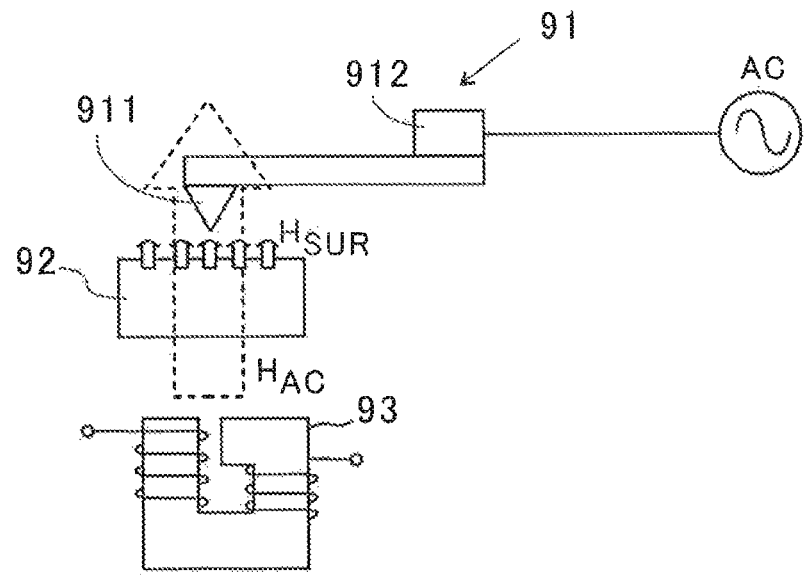
(B)
-Prior Art-
FIG. 6B

MAGNETIC FIELD VALUE MEASURING DEVICE AND METHOD FOR MEASURING MAGNETIC FIELD VALUE

TECHNICAL FIELD

This invention relates to magnetic field measuring devices that measure direct-current magnetic fields (DC magnetic fields) originating from specimens, and magnetic field measuring methods for measuring DC magnetic fields originating from specimens.

Specifically, this invention relates to a magnetic field measuring device and a magnetic field measuring method that make it possible to measure the DC magnetic fields with high accuracy.

BACKGROUND ART

Conventionally, magnetic force microscope (MFM) is known as a device for observing magnetic fields originating from specimens.

One type of MFM is for observing alternating-current magnetic fields (AC magnetic fields) and the other type of MFM is for observing DC magnetic fields.

Since the present invention is an art related to MFMs for observing DC magnetic fields, hereinafter conventional MFMs for observing DC magnetic fields will be described.

FIG. 6(A) is a view to explain a conventional MFM for observing DC magnetic fields (see Patent Literature 1). In the MFM depicted in FIG. 6(A), a probe 811 of a cantilever 81 is made of a hard magnetic material. Once a hard magnetic material is magnetized, magnetization reversal thereof is difficult to occur. In FIG. 6(A), an alloy of cobalt and chrome, a compound of iron and platinum, or the like is employed as the hard magnetic material.

In the MFM of FIG. 6(A), the cantilever 81 is oscillated by a piezoelectric element 812 at a resonant frequency or a frequency close to the resonant frequency (for example, approximately 300 kHz). An alternating-current power supply for the oscillation is denoted by AC in FIG. 6(A). A magnetic interaction occurs between the probe 811 and a specimen 82.

This magnetic interaction causes apparent change in the spring constant of the cantilever 81. This apparent change in the spring constant makes the resonant frequency of the cantilever 81 change. As a result, a vibrating state (amplitude and phase) of the probe 811 also changes.

In the MFM of FIG. 6(A), the change of the amplitude and phase in the vibration of the probe 811 (change in the spring constant of the cantilever 81) is optically detected. This makes it possible to obtain distribution of a magnetic field gradient on the surface of the specimen 82 as an image.

CITATION LIST

Patent Literature

Patent Literature 1: JP 2003-65935 A
Patent Literature 2: WO 2009/0101992 A1

SUMMARY OF INVENTION

Technical Problem

In the MFM of FIG. 6(A), the magnetic field of the specimen 82 is not directly measured, but the magnetic field gradient of the specimen 82 is detected based on a value of the change in the spring constant (value of the change in the amplitude and phase) of the cantilever 81.

In the MFM of FIG. 6(A), it is difficult to detect the magnetic field gradient near the surface of the specimen 82, because the short range force, such as van der Waals force, is strong near the surface compared to the magnetic force that is long range force. Thus, the magnetic field gradient is measured at distances between the probe and the specimen where the magnetic force is stronger than the short range force, and the improvement of the spatial resolution is limited by the distances between the probe and the specimen, where the magnetic force is the main force.

The applicants of the present application have proposed the art depicted in FIG. 6(B) to overcome this inconvenience (Patent Literature 2). In this art, a cantilever 91 is oscillated by a piezoelectric element 912 at a resonant frequency or a frequency close to the resonant frequency. An alternating-current power supply for the oscillation is denoted by AC in FIG. 6(B). A probe 911 at the end of the cantilever 91 is made of a soft magnetic material, and an alternating-current external magnetic field (AC external magnetic field) $H_{AC}$ is applied to the probe 911, using a coil 93. The magnetization of the probe 911 is periodically changed, and the degree of frequency modulation introduced into the forced vibration of the probe 911 by the direct-current magnetic field (DC magnetic field) of the specimen 92 is measured. From the measured result, the DC magnetic field gradient $\partial H_{SUR}/\partial Z$ on the surface of the specimen 92 can be measured.

With the art of Patent Literature 2, the DC magnetic field gradient $\partial H_{SUR}/\partial Z$ on the surface of the specimen 92 can be detected with high accuracy by the frequency modulation on the forced vibration of the probe 911 by the piezoelectric element 912, with the AC external magnetic field $H_{AC}$.

Although the art of Patent Literature 2 is suitable for the detection of the magnetic field gradient on the surface of the specimen 92, but is not able to detect the magnetic field itself.

In the art of Patent Literature 2, a surface magnetic field $H_{SUR}$ is disturbed by the AC external magnetic field $H_{AC}$ in a case where the coercive force of the specimen 92 is small. Therefore, there may be a case where it is difficult to measure magnetic fields with higher accuracy.

An object of the present invention is to measure a DC magnetic field itself originating from a specimen with high accuracy without disturbing the DC magnetic field.

Solution to Problem

Typical functioning of the present invention will be described below.

(a) Applied to an oscillated probe made from a paramagnetic material or the like (material whose intensity of magnetization is proportionate to an external magnetic field) is an AC external magnetic field having a nonzero (large) gradient in the direction of the vibration of the probe.

(b) Applied at the apex of the probe is an AC magnetic field having a frequency different from a mechanical vibration frequency of the probe and having a nonzero gradient in the direction of the mechanical vibration of the probe.

(c) The DC magnetic field from a specimen that is applied to the apex of the probe is changed by canceling with a DC external magnetic field, to weaken the frequency modulation of the vibration of the probe.

(d) The DC external magnetic field is measured when the frequency modulation does not occur or the intensity of the frequency modulation takes the minimum value. This is the DC magnetic field originating from the specimen.

The magnetic field measuring device of the present invention includes the following embodiments.

(1)

A magnetic field measuring device which detects a DC magnetic field originating from a specimen, which includes:

a vibrational probe unit comprising a probe, the probe comprising one or more material whose intensity of magnetization is proportionate to an external magnetic field;

a mechanical vibration source mechanically oscillating the probe;

a vibration detector detecting a mechanical vibration frequency of the probe and a mechanical vibration amplitude of the probe;

an AC magnetic field generator applying an AC magnetic field to the probe, the AC magnetic field having a frequency different from the mechanical vibration frequency of the probe and having a nonzero gradient in a direction of the mechanical vibration of the probe;

a DC external magnetic field generator applying to the probe a DC external magnetic field in the direction of the mechanical vibration of the probe;

a frequency modulation detector detecting frequency modulation occurring in the mechanical vibration of the probe from the mechanical vibration frequency detected by the vibration detector;

a DC external magnetic field adjuster adjusting intensity of the DC external magnetic field in the direction of the mechanical vibration of the probe applied by the DC external magnetic field generator to the probe; and a DC magnetic field determination unit determining a value of the DC magnetic field in the direction of the mechanical vibration of the probe originating from the specimen, based on an output value of the DC external magnetic field generator when intensity of the frequency modulation takes a minimum value or on an expected output value of the DC external magnetic field generator when the intensity of the frequency modulation is expected to take a minimum value.

(2)

The magnetic field measuring device according to (1), wherein the DC external magnetic field adjuster adjusts the DC external magnetic field such that the DC external magnetic field totally cancels the DC magnetic field.

(3)

The magnetic field measuring device according to (1), wherein the DC external magnetic field adjuster adjusts the DC external magnetic field such that the DC external magnetic field partly cancels the DC magnetic field.

(4)

The magnetic field measuring device according to any one of (1) to (3), wherein the AC magnetic field generator comprises an electromagnetic coil.

(5)

The magnetic field measuring device according to any one of (1) to (4), wherein the AC magnetic field generator comprises two or more electromagnetic coils;

the two or more electromagnetic coils generate a plurality of magnetic fields in directions such that the plurality of magnetic fields are mutually cancelled at the apex of the probe, such that the AC magnetic field generator generates a magnetic field having a position where magnetic field amplitude is zero; and a magnetic field gradient of the magnetic field generated by the AC magnetic field generator at the position where the magnetic field amplitude is zero is greater than any magnetic field gradient of the magnetic field generated by each single electromagnetic coil of the two or more electromagnetic coils.

(6)

The magnetic field measuring device according to any one of (1) to (5), wherein the DC external magnetic field generator comprises an electromagnetic coil which applies a magnetic field to the probe; and the DC external magnetic field adjuster comprises an electric current adjuster.

(7)

The magnetic field measuring device according to any one of claims (1) to (6), which further includes:

a mechanism scanning a surface of the specimen one-dimensionally, two-dimensionally, or three-dimensionally by means of the probe.

(8)

A method for measuring a DC magnetic field originating from a specimen by means of a vibrational probe unit comprising a probe, the probe comprising a one or more magnetic material whose intensity of magnetization is proportionate to intensity of an external magnetic field, wherein the method includes the steps of:

mechanically oscillating the probe;

applying an AC magnetic field and a DC external magnetic field to the probe, wherein the AC magnetic field has a frequency different from a mechanical vibration frequency of the probe and has a nonzero gradient in a direction of the mechanical vibration of the probe, and wherein the DC external magnetic field is applied in the direction of the mechanical vibration of the probe and is applied in a direction in which the DC magnetic field originating from the specimen is cancelled;

detecting frequency modulation which occurs in the mechanical vibration of the probe;

adjusting intensity of the DC external magnetic field applied to the probe in the direction of the vibration, based on detection result of the frequency modulation;

determining a value of the DC magnetic field in the direction of the vibration originating from the specimen, based on a value of the DC external magnetic field when the frequency modulation does not occur or when intensity of the frequency modulation takes a minimum value, or on an expected value of the DC external magnetic field when the intensity of the frequency modulation is expected to take a minimum value.

(9)

The method for measuring the magnetic field according to (8), which includes the step of:

adjusting the DC external magnetic field such that the DC external magnetic field totally cancels the DC magnetic field.

(10)

The method for measuring the magnetic field according to (8), which includes the steps of:

adjusting the DC external magnetic field such that the DC external magnetic field partly cancels the DC magnetic field; and determining the value of the DC magnetic field in the direction of the vibration originating from the specimen, based on at least two values of the DC external magnetic field and intensities of frequency modulation corresponding to the at least two values of the DC external magnetic field.

(11)

The method for measuring the magnetic field according to any one of (8) to (10), which includes the step of:

either (a) calibrating the AC magnetic field such that intensity of the frequency modulation becomes zero, or (b) calibrating the AC magnetic field such that the intensity of the frequency modulation gets closer to zero.

(12)

The method for measuring the magnetic field according to any one of (8) to (11), which includes the step of:

scanning a surface of the specimen one-dimensionally, two-dimensionally, or three-dimensionally by means of the probe.

Advantageous Effects of Invention

In the present invention, a probe unit including a probe that has one or more material(s) whose intensity of magnetization is proportionate to an external magnetic field is oscillated, and such an AC external magnetic field is applied to the probe that frequency modulation occurs in the mechanical vibration of the probe when a DC magnetic field is applied at the probe position (that frequency modulation does not occur in the mechanical vibration of the probe when the DC magnetic field is not applied at the probe position).

When the frequency modulation occurring in the mechanical vibration of the probe unit based on the DC magnetic field originating from the specimen takes zero due to the DC external magnetic field or when the intensity of this frequency modulation takes the minimum value, such a DC external magnetic field is measured or calculated as the DC magnetic field originating from the specimen.

According to the present invention, a DC magnetic field itself originating from a specimen can be measured with high accuracy without disturbing the DC magnetic field originating from the specimen.

BRIEF DESCRIPTION OF DRAWINGS

FIG. 3 depicts relationships between a DC external magnetic field $H_{zEXT}^{dc}$ and frequency modulation. FIG. 3(A) depicts a way where when the DC external magnetic field $H_{zEXT}^{dc}$ corresponds to a DC magnetic field $H_{zSMP}^{dc}$, the intensity of the wave of frequency demodulation $I_{FM}$ is zero, and FIG. 3(B) is a view to explain calculation of the DC magnetic field $H_{xEXT}^{dc}$ when the intensity of the wave of frequency demodulation $I_{FM}$ is zero, by extrapolation.

FIG. 6 is a view to explain conventional arts. FIG. 6(A) is a view to explain a conventional magnetic force microscope, and FIG. 6(B) is a view to explain a magnetic force microscope according to the present inventors' proposal.

DESCRIPTION OF EMBODIMENTS

Figure 1:
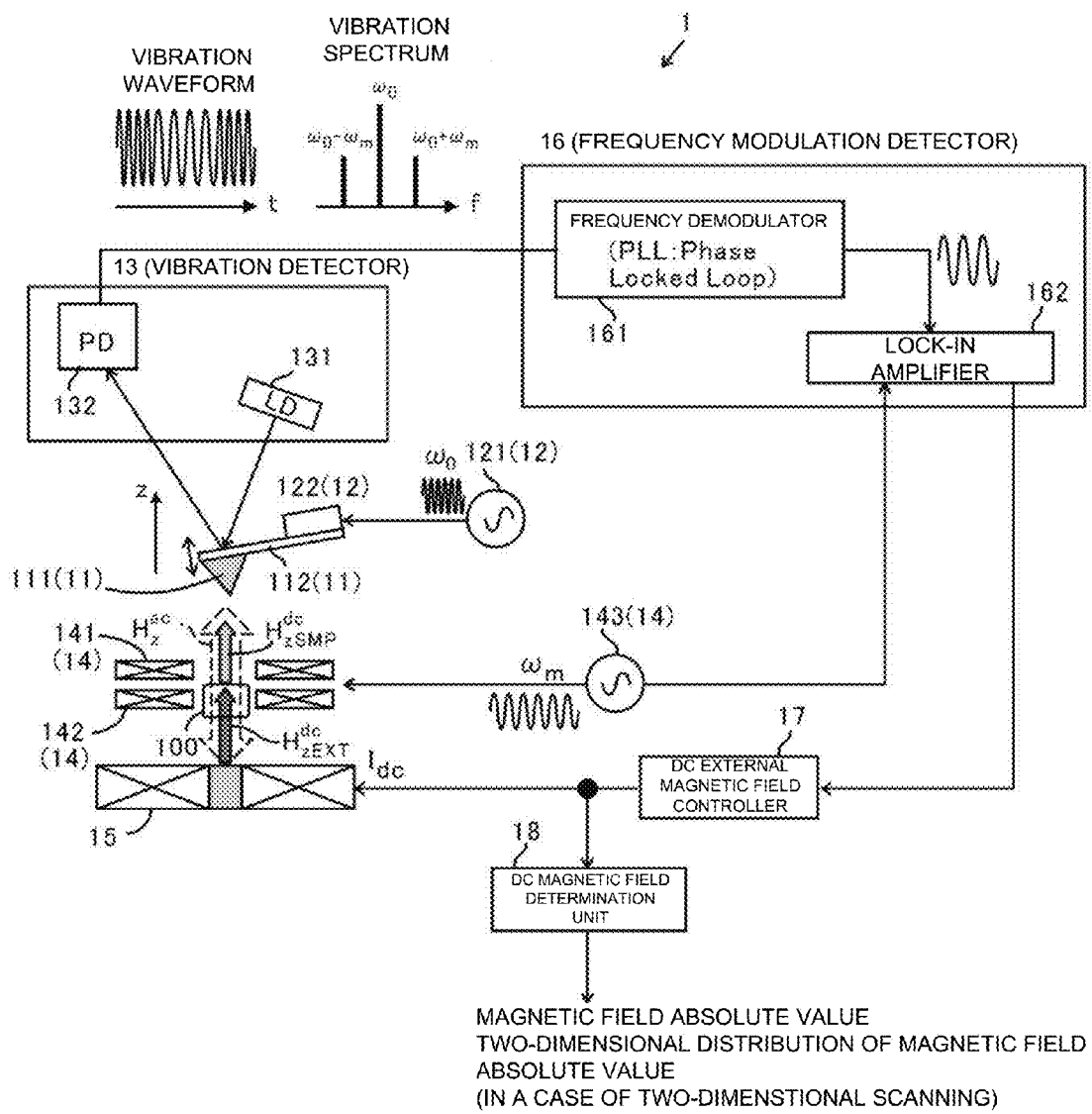
FIG. 1 is a block diagram depicting one embodiment of the magnetic field measuring device of the present invention.

A probe unit is a unit that vibrates elastically according to the Hooke's law. A typical concrete example of the probe unit is a cantilever.

A probe, which is a detecting part of the probe unit, includes one or more material(s) whose intensity of magnetization is proportionate to an external magnetic field. Here, being proportionate to an external magnetic field means that for example, the intensity of magnetization is proportionate to an external magnetic field without showing hysteresis. That is, a paramagnetic material or diamagnetic material whose intensity of magnetization is proportionate to an external magnetic field is used for the probe. A ferromagnetic material that does not show hysteresis can be used as well.

A mechanical vibration source is provided for the probe unit. The mechanical vibration source can make the probe vibrate at a resonant frequency or a frequency close to the resonant frequency. A typical concrete example of the mechanical vibration source is a piezoelectric element.

A vibration detector can optically detect the vibration of the probe unit, and measure at least a change of frequency in the vibration. In the present invention, the intensity of the frequency modulation on the vibration of the probe can be measured, for example, by measurement of the intensity of a side band of the frequency modulation in a probe vibration spectrum, or by measurement of the intensity of a frequency demodulation signal of a frequency demodulator, or the like.

The vibration detector can be composed of, for example, a mirror provided for the probe unit, a laser that irradiates the mirror with a laser beam, and a photodiode that receives a light reflected by the mirror.

As described later, an AC magnetic field generator can have two electromagnetic coils driven by alternating-current, for example. The AC magnetic field generator may have three or more electromagnetic coils.

It is preferable that the sum of components of the AC magnetic fields generated by the electromagnetic coils of the AC magnetic field generator in the direction of the vibration of the probe (hereinafter may referred to just as "vibration direction") at the probe position is zero.

It is also preferable that at the probe position, the gradient of the AC magnetic field generated by the AC magnetic field generator in the vibration direction is not zero but takes a value as large as possible.

The DC external magnetic field generator can have an electromagnetic coil with an iron core that is driven by direct current, for example. The DC external magnetic field generator may have two or more electromagnetic coils. The DC external magnetic field generator may have a permanent magnet that is moved by an actuator.

A DC external magnetic field adjustor may be either a unit operated by a human operator, or a (automated) controller. This controller is configured so as to control the DC external magnetic field generated by the DC external magnetic field generator through PID control (Proportional Integral Derivative Controller) and/or PI control (Proportional Integral Controller), so that frequency modulation does not occur to the mechanical vibration of the probe or so that the intensity of the frequency modulation on the mechanical vibration of the probe is minimized.

The magnetic field measuring device of the present invention can be made so that while a scanning mechanism scans the surface of a specimen one-dimensionally, two-dimensionally or three-dimensionally by means of the probe, a DC magnetic field determination unit determines the DC magnetic field.

As described later, if the DC external magnetic field generator has an electromagnetic coil with an iron core, the DC magnetic field determination unit can determinate the magnetic field originating from the specimen at the probe position, by means of a value of the direct current flowing through the electromagnetic coil of the DC external magnetic field generator when no frequency modulation occurs to the mechanical vibration of the probe or when the frequency modulation on the mechanical vibration of the probe is minimized.

If the DC external magnetic field generator has an electromagnetic coil with an iron core, there may be a case where the accurate DC external magnetic field cannot be determined by means of a value of the direct current flowing through the electromagnetic coil since the iron core has residual magnetization (hysteresis). In this case, the DC external magnetic field can be determined with high accuracy by means of a magnetic field detector (for example, a magnetic sensor using a coil, Hall element or the like). For example, prior to measurement, the magnetic field detector can be arranged at the probe position. This detector makes it possible to measure the DC external magnetic field.

As described later, when the DC external magnetic field generator has a permanent magnet and an actuator for moving this permanent magnet, the DC magnetic field determination unit can determine the DC magnetic field originating from the specimen at the apex of the probe by means of moved distance (position) of the actuator when no frequency modulation occurs to the mechanical vibration of the probe or when the frequency modulation on the mechanical vibration of the probe is minimized.

As described above, while being able to have an electromagnetic coil, the DC external magnetic field generator may have a permanent magnet driven by an actuator.

If the DC external magnetic field generator has an electromagnetic coil with an iron core, frequency modulation may occur to the vibration of the probe due to influence of the DC magnetic field generated by the residual magnetization of the iron core. It is preferable to make the above residual magnetization of the iron core zero in order to avoid this influence.

When the residual magnetization of the iron core in the electromagnetic coil is made to be zero, current flowing through the electromagnetic coil has only to be adjusted by a DC external magnetic field adjuster so that frequency modulation on the vibration of the probe does not occur, or so that the intensity of frequency modulation on the vibration of the probe is minimized, as described later.

The value of the DC magnetic field originating from the specimen is: a sum of a value of the DC magnetic field determination unit determined by the DC external magnetic field and a value of the residual magnetic field; or a value obtained by subtracting the value of the residual magnetic field from a value of the DC magnetic field determined by the DC external magnetic field determination unit.

The magnetic field measuring device of the present invention can be made so that while a scanning mechanism scans the surface of the specimen one-dimensionally, two-dimensionally or three-dimensionally by means of the probe, the DC magnetic field determination unit determines the DC magnetic field. The magnetic field measuring device of the present invention can be made so that the measured result is outputted to an output device such as an image display device and a printer.

A structure and functions of the present invention will be described with reference to FIG. 1 hereinafter.

FIG. 1 is a block diagram depicting a magnetic field measuring device 1 of the present invention.

In FIG. 1, the magnetic field measuring device 1 includes a probe unit 11, a mechanical vibration source 12, a vibration detector 13, an AC magnetic field generator 14, a DC external magnetic field generator 15, a frequency modulation detector 16, a DC external magnetic field controller ("DC external magnetic field adjuster" in the present invention) 17 and a DC magnetic field determination unit 18.

The probe unit 11 is a cantilever in the magnetic field measuring device 1 of FIG. 1. The cantilever includes an arm 112 and a probe 111 that is provided on the end of the arm 112. A mirror surface for reflecting laser light is provided on a side of the end of the arm 112 where the probe 111 is not provided. The probe 111 is a chip coated with a paramagnetic material, for detecting a DC magnetic field $H_{zSMP}^{dc}$ originating from a specimen 100.

The mechanical vibration source 12 is a device that oscillates the probe unit 11 (oscillates the probe 111). In the magnetic field measuring device 1 of FIG. 1, the mechanical vibration source 12 includes an AC power supply 121 and a piezoelectric element 122.

The vibration detector 13 detects a vibration waveform of the probe 111. In the magnetic field measuring device 1 of FIG. 1, the vibration detector 13 includes a laser 131 (denoted by "LD" in FIG. 1) and a photodiode 132 (denoted by "PD" in FIG. 1).

The AC magnetic field generator 14 generates an AC magnetic field that is zero at the apex of the probe ($H_z^{ac}=0$), and whose gradient ($\partial H_z^{ac}/\partial z$) is large in the direction of the vibration of the probe (z-axis direction). The AC magnetic field generator 14 applies to the probe 111 an AC magnetic field $H_z^{ac}$ that has a frequency $\omega_m$ different from a frequency $\omega_0$ of the oscillation of the probe. In this embodiment, the AC magnetic field generator 14 includes two alternating-current coils (air-core coils) 141 and 142 generating magnetic fields that are mutually cancelled at the apex of the probe, and an AC power supply 143.

In the magnetic field measuring device 1, as the oscillation frequency $\omega_0$ for the probe unit 11, either the resonant frequency or a frequency whose Q curve has a nonzero gradient can be suitably selected based on the resonant frequency of the cantilever of the probe unit 11 and the Q curve (a curve of the Q factor of the cantilever plotted against a frequency). The closer to the resonant frequency the oscillation frequency is, the more the spectrum intensity of the side band ($\omega_0 \pm \omega_m$) of frequency modulation can be enhanced. Thus, it is preferable that when a magnetic field is measured, a frequency close to the resonant frequency is employed as the oscillation frequency. As described later, in a case where the surface of the specimen is scanned, a frequency where the gradient of the Q curve is steep, which means that the signal gain changes largely according to a frequency change, may be employed as the oscillation frequency in view of ease of the control of keeping the amplitude of the vibration of the probe constant to keep a certain probe-specimen distance. As the frequency of the mechanical vibration of the probe unit 11, generally, either the resonant frequency $\omega_r$ or a frequency close to the resonant frequency, for example, a frequency of no less than $\omega_r-\omega_r/3Q$ and no more than $\omega_r+\omega_r/3Q$, preferably no less than $\omega_r-\omega_r/4Q$ and no more than $\omega_r+\omega_r/4Q$ (here, Q represents the Q factor of the probe unit 11) is selected. As the frequency $\omega_m$ of the AC magnetic field generated by the AC magnetic field generator 14, the frequency $\omega_m$ such that the Q curve has a nonzero gradient at the frequency $\omega_0 \pm \omega_m$ can be suitably selected. For example a frequency of no more than $\omega_r/3Q$, preferably no more than $\omega_r/4Q$ (here, Q represents the Q factor of the probe unit 11) can be selected as $\omega_m$. For example, in a case where the resonant frequency $\omega_r=300$ kHz and Q=500, $\omega_0$ may be 300.01 kHz and $\omega_m$ may be 100 Hz, or the like.

At this time, the frequency of the side band spectrum due to the frequency modulation on the vibration of the probe is $\omega_0 \pm \omega_m$.

The DC external magnetic field generator 15 applies to the probe 111 a DC external magnetic field $H_{zEXT}^{dc}$ in the vibration direction (z axis direction). In this embodiment, the DC external magnetic field generator 15 includes a direct-current coil with an iron core (direct-current electromagnet).

The frequency modulation detector 16 detects the frequency modulation occurring to the vibration of the probe 111 from the vibration waveform detected by the vibration detector 13. The frequency modulation detector 16 includes a frequency demodulator (PLL: Phase Locked Loop) 161 and a lock-in amplifier 162.

The DC external magnetic field controller 17 controls the DC external magnetic field $H_{zEXT}^{dc}$ generated by the DC external magnetic field generator 15 in the vibration direction (z axis direction) so that the frequency modulation on the vibration of the probe takes zero or the minimum value based on the detected result of the frequency modulation on the vibration of the probe by the frequency modulation detector 16. Control signals are applied to the DC external magnetic field generator 15 as direct-currents.

FIG. 3(A) depicts a relationship between the DC external magnetic field $H_{zEXT}^{dc}$ and the intensity of the wave of a frequency demodulation (or the intensity of the side band spectrum of the frequency modulation). The horizontal axis represents the DC external magnetic field $H_{zEXT}^{dc}$ and the vertical axis represents the intensity $I_{FM}$ of the wave of the frequency demodulation. As depicted in FIG. 3(A), when the DC external magnetic field $H_{zEXT}^{dc}$ corresponds to the DC magnetic field $H_{zSMP}^{dc}$ originating from the specimen, the intensity $I_{FM}$ of the wave of the frequency demodulation is zero or the minimum.

The DC magnetic field determination unit 18 determines the DC magnetic field $H_{zSMP}^{dc}$ originating from the specimen 100 in the vibration direction (z axis direction) based on the detection result of the frequency modulation detector 16 (degree of the frequency modulation) and the output value of the DC external magnetic field controller 17.

Figure 2:
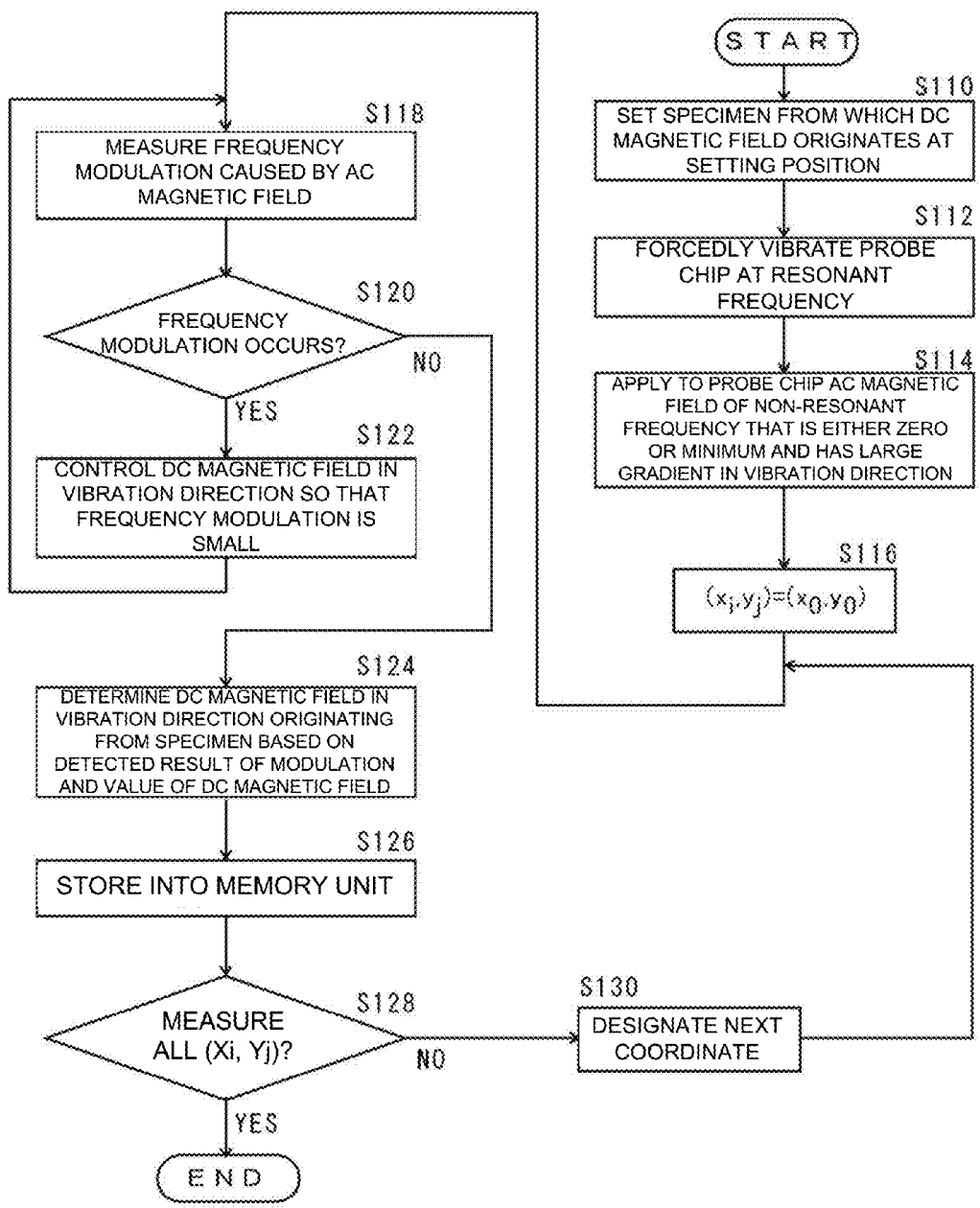
FIG. 2 is a flowchart depicting functioning of the magnetic field measuring device of FIG. 1.

The method for measuring a magnetic field of the present invention can be carried out with the magnetic field measuring device 1 of FIG. 1. FIG. 2 is a flowchart depicting the method for measuring a magnetic field of the present invention. Hereinafter, functions of the magnetic field measuring device 1 of FIG. 1 will be described with reference to the flowchart of FIG. 2.

The specimen 100 from which a DC magnetic field originates is set at a setting position (S110).

The probe 111 is forcedly oscillated at a frequency close to the resonant frequency $\omega_r$ (S112).

The AC magnetic field $H_z^{ac}$ of a non-resonant frequency $\omega_m$ is applied to the probe 111 (S114). At the apex of the probe, this AC magnetic field is zero and its gradient is large in the vibration direction.

The probe 111 is set at the initial coordinate $(x_0, y_0)$ on the specimen 100 (S116), and the frequency modulation caused by the AC magnetic field is measured (S118).

It is detected whether the frequency modulation is caused on the mechanical vibration of the probe 111 (S120). If the frequency modulation is generated ("YES" in S120), the DC magnetic field in the vibration direction is controlled so that the frequency modulation is minimized (S122), the process is returned to S118, and the frequency modulation on the vibration of the probe caused by the AC magnetic field is measured again.

In S120, if no frequency modulation is caused ("NO" in S120) or if the intensity of the frequency modulation is minimized, the DC magnetic field (DC magnetic field $H_{zSMP}^{dc}$) in the vibration direction originating from the specimen 100 is determined by the DC magnetic field determination unit 18 based on the detection result of the modulation and a value of the DC magnetic field (DC external magnetic field $H_{zEXT}^{dc}$) (S124).

The value of the determined DC magnetic field $H_{zSMP}^{dc}$ is stored into a memory unit in the DC magnetic field determination unit 18 (S126).

It is determined whether the processes of S118 to S126 have been carried out on all the coordinates. If it is determined that there is any unprocessed coordinate ("NO" in S128), the next coordinate is designated (S130) and the processes of S118 to S126 are carried out again. In S128, if it is determined that there is no unprocessed coordinate ("YES" in S128), the process is ended.

Hereinafter, this embodiment will be described in more detail.

$F = k \times z$ is met wherein F represents an oscillating force caused by the mechanical vibration source 12, k represents a spring constant of the probe unit 11 in the z direction of the arm 112 (direction vertical to the surface of the specimen), and z represents displacement from a zero point (unloaded position) in the vibration direction of the probe 111 (z axis direction).

Here, the AC magnetic field in the z axis direction that is applied to the probe 111 is represented by $H_z^{ac}$, and the DC magnetic field is represented by $H_z^{dc}$. The magnetic pole of the apex of the probe 111 caused by the DC magnetic field $H_z^{dc}$ is represented by $q_{tip}^{dc}$, and the magnetic pole of the apex of the probe 111 caused by the AC magnetic field $H_z^{ac}$ is represented by $q_{tip}^{ac}$.

A change $\Delta k_m$ in the spring constant caused by the magnetic fields ((AC magnetic field $H_z^{ac}$)+(DC magnetic field $H_z^{dc}$)) can be represented as follows where a force the probe 111 receives from the magnetic field is $F_m$:

$$\Delta k_m = \Delta\left(\frac{\partial F_m}{\partial z}\right) \qquad (1)$$

$$= \frac{\partial}{\partial z}((q_{tip}^{dc} + q_{tip}^{ac}\cos(\omega_m t))(H_z^{dc} + H_z^{ac}\cos(\omega_m t)))$$

$$= \left(q_{tip}^{dc}\frac{\partial H_z^{dc}}{\partial z} + \frac{q_{tip}^{ac}}{2}\frac{\partial H_z^{ac}}{\partial z}\right) +$$

$$\left(q_{tip}^{ac}\frac{\partial H_z^{dc}}{\partial z} + q_{tip}^{dc}\frac{\partial H_z^{ac}}{\partial z}\right)\cos(\omega_m t) +$$

$$\frac{q_{tip}^{ac}}{2}\frac{\partial H_z^{ac}}{\partial z}\cos(2\omega_m t)$$

In the formula (1), $q_{tip}^{dc}$ is proportional to $H_z^{dc}$. Thus, it is necessary to enlarge a term of $q_{tip}^{dc}(\partial H_z^{ac}/\partial z)$ in order to detect $H_z^{dc}$ with high sensitivity. Here, two air-core coils that are combined so that directions of the magnetic fields these coils generate are opposite to each other is effective for enlarging $(\partial H_z^{ac}/\partial z)$, which is the gradient of the AC magnetic field in the vibration direction (z axis direction). Between these two air-core coils, a position where the polarity of the AC magnetic field $H_z^{ac}$ is inversed, that is, a position where the intensity of $H_z^{ac}$ is zero and $(\partial H_z^{ac}/\partial z)$ is maximized, exists. The highest sensitivity of the detection can be obtained by arranging the apex of the probe in this position. In FIG. 1, the probe of the cantilever is illustrated over the two air-core coils in the sheet for simplification, but actually, the arrangement is made so that the apex of the probe is arranged between these two air-core coils. Further, at this position, $q_{tip}^{ac} \approx 0$ because the intensity of $H_z^{ac}$ that the vibrating tip of the probe receives is approximately zero.

Therefore, the formula (1) can be represented as the following formula (2):

$$\Delta k_m = q_{tip}^{dc} \frac{\partial H_z}{\partial z} + q_{tip}^{dc} \frac{\partial H_z^{ac}}{\partial z} \cos(\omega_m t) \qquad (2)$$

From the formula (2), when a direct-current component $q_{tip}^{dc}$ is zero, $\Delta k_m = 0$ and the spring constant of the probe 111 is k, and therefore no modulation occurs. Thus, in the magnetic field measuring device 1, the AC magnetic field generator 14 can be calibrated so that the frequency modulation takes zero (so that $q_{tip}^{ac}=0$, that is, $H_z^{ac}=0$) when the specimen 100 is not set (when $q_{tip}^{dc}=0$, that is, $H_z^{dc}=0$).

In a case where such calibration is carried out, when the specimen 100 is set, $q_{tip}^{dc}=a \times H_{zSMP}^{dc}$, wherein a is a constant determined by a material composing the probe 111 (paramagnetic material or the like). Thus, $\Delta k_m \neq 0$, and the frequency modulation detector 16 detects the frequency modulation occurring to the vibration of the probe 111 from the vibration waveform detected by the vibration detector 13.

In a case where the DC external magnetic field controller 17 makes the DC magnetic field $H_{zSMP}^{dc}$ be cancelled by the DC external magnetic field $H_{zEXT}^{dc}$ (in a case where the intensity of the DC magnetic field $H_{zSMP}^{dc}$ is the same as the DC external magnetic field $H_{zEXT}^{dc}$ and they are in the opposite directions), the DC magnetic field determination unit 18 determines the value of the DC external magnetic field $H_{zEXT}^{dc}$ as the value of the DC magnetic field $H_{zSMP}^{dc}$.

That is, because $q_{tip}^{dc}=0$, that is, because $H_z^{dc}=0$ (i.e. $\Delta k_m=0$) in this case, the frequency modulation does not occur to the vibration of the probe 111, and the frequency modulation detector 16 does not detect the frequency modulation on the vibration of the probe 111.

Although the AC magnetic field in the vibration direction (z axis direction) can be generated by one air-core coil, $q_{tip}^{ac} \neq 0$ in this case because the intensity of $H_z^{ac}$ is not zero. Therefore, the first order modulation component that fluctuates according to $\cos(\omega_m t)$ can be represented as follows:

$$\Delta k_m(\omega_m t) = \left( q_{tip}^{ac} \frac{\partial H_z^{dc}}{\partial z} + q_{tip}^{dc} \frac{\partial H_z^{ac}}{\partial z} \right) \cos(\omega_m t) \qquad (3)$$

In this case, $q_{tip}^{ac}(\partial H_z^{dc}/\partial z)$ of the first term remains even if $q_{tip}^{dc}=0$ can be realized and the second term can be eliminated by cancelation of the DC magnetic field $H_{zSMP}^{dc}$ originating from the specimen 100 by the DC external magnetic field $H_{zEXT}^{dc}$. Thus, $\Delta k_m$ takes the minimum value but does not become zero. Because the intensity of $(\partial H_z^{ac}/\partial z)$ is significantly small compared with the case where two air-core coils are combined, the measurement accuracy is decreased by being easily affected by measurement noise in obtaining the DC external magnetic field $H_{zEXT}^{dc}$ that minimizes the intensity of the frequency modulation.

Thus, it is desirable for generation of the AC magnetic field that two air-core coils are combined, to make the intensity of $H_z^{ac}$ zero and maximize $(\partial H_z^{ac}/\partial z)$ at the position of the apex of the probe.

For example, there may be a case where in the measurement of the DC magnetic field $H_{zSMP}^{dc}$, the DC magnetic field of the probe 111 cannot be made zero because the DC magnetic field $H_{zSMP}^{dc}$ is larger than the maximum output value of the DC external magnetic field $H_{zEXT}^{dc}$ by the DC external magnetic field controller 17. In this case, the DC magnetic field $H_{zSMP}^{dc}$ can be calculated from the value of the DC external magnetic field $H_{zEXT}^{dc}$.

That is, when the AC magnetic field generator 14 is calibrated as described above, there may be a case where the DC external magnetic field controller 17 can cancel only a part of the DC magnetic field $H_{zSMP}^{dc}$ by the DC external magnetic field $H_{zEXT}^{dc}$. In this case, the DC magnetic field determination unit 18 can determine the DC magnetic field $H_{zSMP}^{dc}$ based on the intensity of the frequency modulation signal and either the value of the DC external magnetic field $H_{zEXT}^{dc}$ or the value of a direct-current $I^{dc}$ that flows through the DC external magnetic field generator 15.

FIG. 3(B) depicts a relationship of the DC external magnetic field $H_{zEXT}^{dc}$ and the intensity of the frequency-demodulated wave (or intensity of a side band spectrum of the frequency modulation) in this case. The horizontal axis represents the DC external magnetic field $H_{zEXT}^{dc}$, and the vertical axis represents the intensity $I_{FM}$ of the frequency-demodulated wave. As depicted in FIG. 3(B), if values of the frequency modulation on two DC external magnetic fields $H_{zEXT}^{dc}$ are found, the DC external magnetic field $H_{zExt}^{dc}$ which makes the intensity of the frequency demodulation zero, that is, the DC magnetic field $H_{zSMP}^{dc}$, can be estimated (linear fit in FIG. 3(B)).

Specifically, the DC magnetic field $H_{zSMP}^{dc}$ can be determined as follows.

It is assumed that the device is initialized so that the frequency modulation is zero when the specimen 100 is not set.

It is assumed that when the specimen 100 is set, the intensity of the frequency modulation in a case where the DC external magnetic field $H_{zEXT}^{dc}$ is not applied (side band spectrum component caused by the frequency modulation on the vibration of the probe, $\omega_s = \omega_0 \pm \omega_m$) is $A_{EXT=0}$.

It is assumed that when the intensity of the frequency modulation (side band spectrum component, $\omega_s = \omega_0 \pm \omega_m$) is $A_{EXT1}$ ($\neq 0$), the DC external magnetic field $H_{zEXT}^{dc}$=EXT1 is applied.

When the intensity of the frequency modulation changes by $A_{EXT=0} - A_{EXT1}$, the DC external magnetic field $H_{zEXT}^{dc}$ changes from zero to EXT1.

Thus, when the intensity of the frequency modulation changes by $A_{EXT=0} - 0$, the DC external magnetic field $H_{zEXT}^{dc}$ changes from zero to $EXT1 \times A_{EXT=0}/(A_{EXT=0} - A_{EXT1})$. Thus, the DC magnetic field $H_{zSMP}^{dc}$ is determined.

Another embodiment of the present invention will be described hereinafter.

In the embodiment of FIG. 1, the AC magnetic field generator 14 includes two alternating-current coils 141 and 142, and the AC power supply 143.

Figure 4:
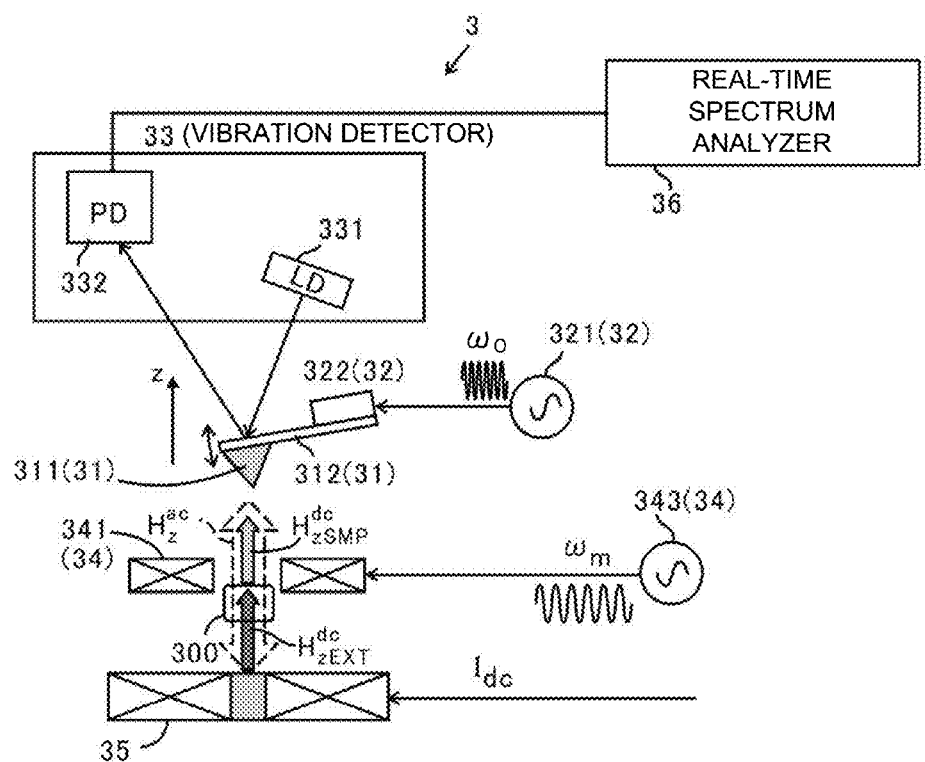
FIG. 4 is a block diagram depicting another embodiment of the magnetic field measuring device of the present invention.

In contrast, a magnetic field measuring device of FIG. 4 measures a magnetic field by applying a zero method to the spectrum intensity. An AC magnetic field genera tor can include one alternating-current coil and an AC power supply.

In FIG. 4, a magnetic field measuring device 3 includes a probe unit 31, a mechanical vibration source 32, a vibration detector 33, an AC magnetic field generator 34, a DC external magnetic field generator 35 and a frequency modulation detector 36.

The probe unit 31, the mechanical vibration source 32, the vibration detector 33 and the DC external magnetic field generator 35 in FIG. 4 are the same as the probe unit 11, the mechanical vibration source 12, the vibration detector 13 and the DC external magnetic field generator 15 illustrated in FIG. 1.

The probe unit 31 is a cantilever, and includes an arm 312 and a probe 311 that is provided on the apex of the arm 312. The probe unit 31 (that is, the probe 311 and the arm 312) is the same as the probe unit 11 (that is, the probe 111 and the arm 112) depicted in FIG. 1. For the probe 311, a paramagnetic probe is used that is produced by deposition of a $Ni_{92.5}Cr_{7.5}$ paramagnetic alloy on a Si probe by 100 nm in thickness. Its magnetic susceptibility is about $5\times10^{-8}$ H/m (relative permeability is 1.04).

Here, the probe 311 is arranged about 7 mm away from the surface of the specimen 300 due to spatial limitation.

The mechanical vibration source 32 includes an AC power supply 321 and a piezoelectric element 322. The mechanical vibration source 32 (that is, the AC power supply 321 and the piezoelectric element 322) is the same as the mechanical vibration source 12 (that is, the AC power supply 121 and the piezoelectric element 122) depicted in FIG. 1.

The vibration detector 33 detects the vibration of the probe 311. The vibration detector 33 includes a laser 331 (denoted by "LD" in FIG. 4) and a photodiode 332 (denoted by "PD" in FIG. 4). The vibration detector 33 (that is, the laser 331 and the photodiode 332) is the same as the vibration detector 13 (that is, the laser 131 and the photodiode 132) depicted in FIG. 1.

The AC magnetic field generator 34 generates an AC magnetic field whose gradient ($\partial H_z^{ac}/\partial z$) is large.

The AC magnetic field generator 34 applies to the probe 311 the AC magnetic field $H_z^{ac}$ that has the frequency $\omega_m$ different from the oscillation frequency $\omega_0$ of the probe.

In this embodiment, the AC magnetic field generator 34 includes one alternating-current coil (air-core coil) 341 and an AC power supply 343.

The DC external magnetic field generator 35 applies to the probe 311 the DC external magnetic field $H_{zEXT}^{dc}$ in the vibration direction (z axis direction). In this embodiment, the DC external magnetic field generator 35 is the same as the DC external magnetic field generator 15 in FIG. 1.

The frequency modulation detector 36 corresponds to the frequency modulation detector 16 in FIG. 1. In FIG. 4, the frequency modulation detector 36 is a real-time spectrum analyzer, and detects the frequency modulation occurring to the vibration of the probe 311 from the vibration waveform detected by the vibration detector 33.

The frequency modulation detector 36 has a function of a frequency demodulator (see the block denoted by reference numeral 161 in FIG. 1) and a function of a lock-in amplifier (see the block denoted by reference numeral 162 in FIG. 1).

A DC external magnetic field controller not depicted in FIG. 4 (see the block denoted by reference numeral 17 in FIG. 1) controls the DC external magnetic field $H_{zEXT}^{dc}$ generated by the DC external magnetic field generator 35 in the vibration direction (z axis direction) so that the frequency modulation becomes zero or small, based on the detection result of the frequency modulation by the frequency modulation detector 36.

Control signals are applied to the DC external magnetic field generator 35 as direct currents.

In this embodiment, an alternating current is made to flow from the AC power supply 343 to the alternating-current coil 341, to generate the AC magnetic field having frequency of 130 Hz and the gradient of the AC magnetic field of 50 (Oe/cm), at the probe position.

The dependency of the spectrum intensity (side band spectrum) on the DC external magnetic field $H_{zEXT}^{dc}$ when the vibration of the probe 311 is frequency modulated is examined with the frequency modulation detector 36.

Figure 5:
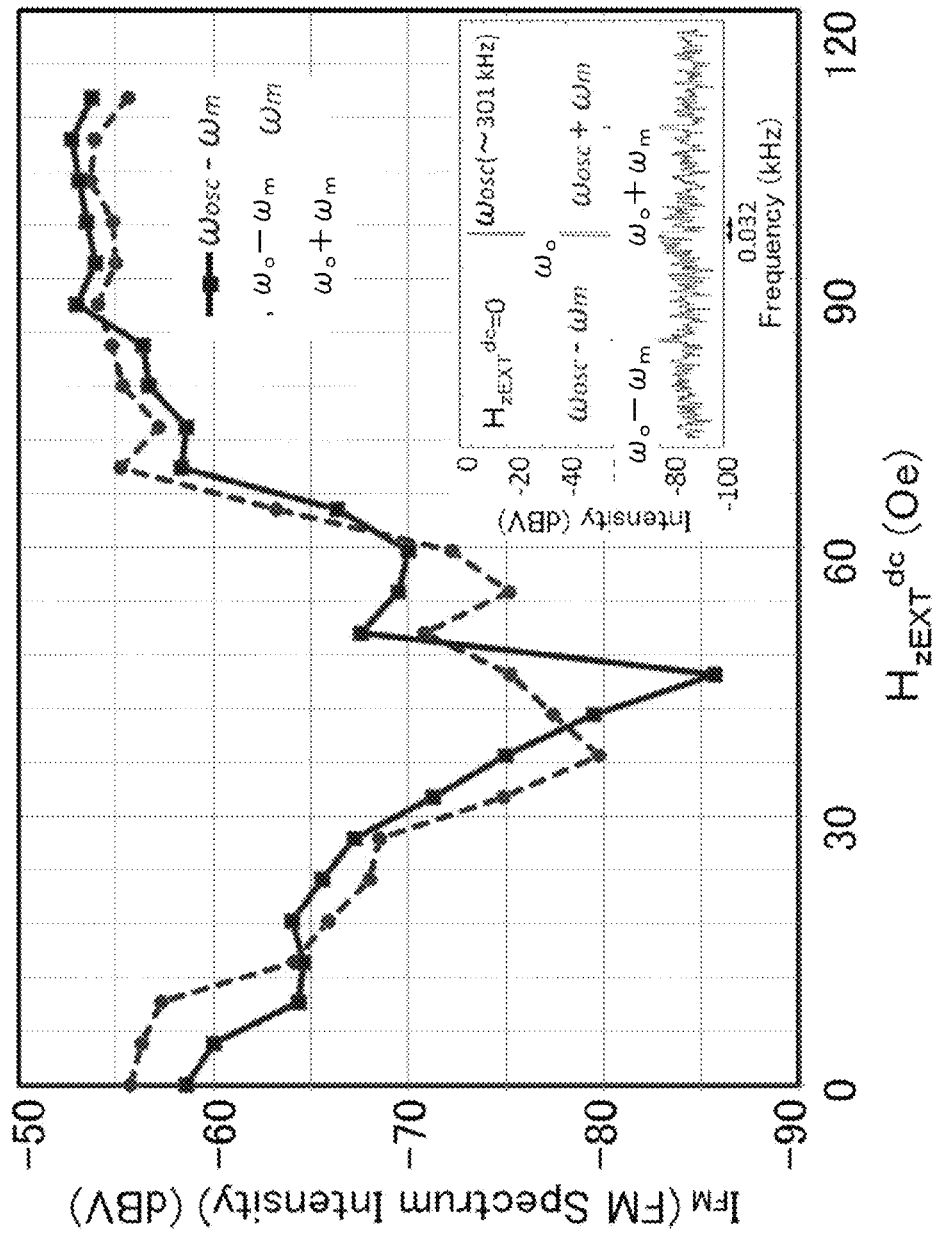
FIG. 5 depicts dependency of the spectrum intensity (sideband spectrum) on a DC external magnetic field when frequency modulation is carried out on the vibration of a probe.

FIG. 5 depicts the dependency of the spectrum intensity (side band spectrum) on the DC external magnetic field $H_{zEXT}^{dc}$ when the vibration of the probe 311 is frequency modulated.

As depicted in FIG. 5, in this embodiment, when $H_{zEXT}^{dc}=0$, the oscillating frequency $\omega_0$ of the probe 311 is about 301 kHz, and the frequency $\omega_m$ of the AC magnetic field is 130 Hz.

The frequency of the side band spectrum caused by the frequency modulation on the vibration of the probe is $\omega_0 \pm \omega_m$.

In FIG. 5, depicted is the spectrum intensity $I_{FM}$ of the frequency modulation on the vibration of the probe when $H_{zEXT}^{dc}$ is increased in the opposite direction to the DC magnetic field $H_{zSMP}^{dc}$ originating from the specimen 300.

It is depicted that as $H_{zEXT}^{dc}$ increases, $I_{FM}$ monotonously decreases, and after $I_{FM}$ takes the minimum value, it begins to increase. Here, the noise level is about −90 dBV.

At the minimum point, the DC magnetic field $H_{zSMP}^{dc}$ originating from the specimen 300 is canceled by the external DC magnetic field $H_{zEXT}^{dc}$. $H_{zEXT}^{dc}$ at this time corresponds to the DC magnetic field $H_{zSMP}^{dc}$ originating from the specimen 300 at the probe position.

In FIG. 5, $I_{FM}$ is minimized when $H_{zEXT}^{dc}$ is about 40 (Oe). Thus, it is found that the DC magnetic field $H_{zSMP}^{dc}$ is about 40 (Oe).

As described above, in the present invention, it is also possible to use an AC magnetic field generator including a single electromagnetic coil, to measure a value of a DC magnetic field of a specimen by applying a zero method to a spectrum intensity.

REFERENCE SIGNS LIST 1, 3 magnetic field measuring device
11, 31 probe unit
12, 32 mechanical vibration source
13, 33 vibration detector
14, 34 AC magnetic field generator
15, 35 DC external magnetic field generator
16, 36 frequency modulation detector
17 DC external magnetic field controller
18 DC magnetic field determination unit
111, 311 probe
112, 312 arm
100, 300 specimen
131 laser
132 photodiode
141, 142 alternating-current coil
143 AC power supply
161 frequency demodulator
162 lock-in amplifier

The invention claimed is:
1. A magnetic field measuring device which detects a direct-current magnetic field originating from a specimen, the device comprising:
   a vibrational probe unit comprising a probe, the probe comprising one or more material whose intensity of magnetization is proportionate to an external magnetic field;
   a mechanical vibration source mechanically oscillating the probe;

a vibration detector detecting a mechanical vibration frequency of the probe and a mechanical vibration amplitude of the probe;

an alternating-current magnetic field generator applying an alternating-current magnetic field to the probe, the alternating magnetic field having a frequency different from the mechanical vibration frequency of the probe and having a nonzero gradient in a direction of the mechanical vibration of the probe;

a direct-current external magnetic field generator applying to the probe a direct-current external magnetic field in the direction of the mechanical vibration of the probe;

a frequency modulation detector detecting frequency modulation occurring in the mechanical vibration of the probe from the mechanical vibration frequency detected by the vibration detector;

a direct-current external magnetic field adjuster adjusting intensity of the direct-current external magnetic field in the direction of the mechanical vibration of the probe applied by the direct-current external magnetic field generator to the probe; and a direct-current magnetic field determination unit determining a value of the direct-current magnetic field in the direction of the mechanical vibration of the probe originating from the specimen, based on an output value of the direct-current external magnetic field generator when intensity of the frequency modulation takes a minimum value or on an expected output value of the direct-current external magnetic field generator when the intensity of the frequency modulation is expected to take a minimum value.

2. The magnetic field measuring device according to claim 1,
wherein the direct-current external magnetic field adjuster adjusts the direct-current external magnetic field such that the direct-current external magnetic field totally cancels the direct-current magnetic field.

3. The magnetic field measuring device according to claim 1,
wherein the direct-current external magnetic field adjuster adjusts the direct-current external magnetic field such that the direct-current external magnetic field partly cancels the direct-current magnetic field.

4. The magnetic field measuring device according to claim 1,
wherein the alternating-current magnetic field generator comprises an electromagnetic coil.

5. The magnetic field measuring device according to claim 1,
wherein the alternating-current magnetic field generator comprises two or more electromagnetic coils;
the two or more electromagnetic coils generate a plurality of magnetic fields in directions such that the plurality of magnetic fields are mutually cancelled at the tip of the probe, such that the alternating-current magnetic field generator generates a magnetic field having a position where magnetic field amplitude is zero; and
a magnetic field gradient of the magnetic field generated by the alternating-current magnetic field generator at the position where the magnetic field amplitude is zero is greater than any magnetic field gradient of the magnetic field generated by each single electromagnetic coil of the two or more electromagnetic coils.

6. The magnetic field measuring device according to claim 1,
wherein the direct-current external magnetic field generator comprises an electromagnetic coil which applies a magnetic field to the probe; and
the direct-current external magnetic field adjuster comprises an electric current adjuster.

7. The magnetic field measuring device according to claim 1, further comprising:
a mechanism scanning a surface of the specimen one-dimensionally, two-dimensionally, or three-dimensionally by means of the probe.

8. A method for measuring a direct-current magnetic field originating from a specimen by means of a vibrational probe unit comprising a probe, the probe comprising a one or more magnetic material whose intensity of magnetization is proportionate to intensity of an external magnetic field, the method comprising the steps of:
mechanically oscillating the probe;
applying an alternating-current magnetic field and a direct-current external magnetic field to the probe, wherein the alternating magnetic field has a frequency different from a mechanical vibration frequency of the probe and has a nonzero gradient in a direction of the mechanical vibration of the probe, and wherein the direct-current external magnetic field is applied in the direction of the mechanical vibration of the probe and is applied in a direction in which the direct-current magnetic field originating from the specimen is cancelled;
detecting frequency modulation which occurs in the mechanical vibration of the probe;
adjusting intensity of the direct-current external magnetic field applied to the probe in the direction of the vibration, based on detection result of the frequency modulation;
determining a value of the direct-current magnetic field in the direction of the vibration originating from the specimen, based on a value of the direct-current external magnetic field when the frequency modulation does not occur or when intensity of the frequency modulation takes a minimum value, or on an expected value of the direct-current external magnetic field when the intensity of the frequency modulation is expected to take a minimum value.

9. The method for measuring the magnetic field according to claim 8, comprising the step of:
adjusting the direct-current external magnetic field such that the direct-current external magnetic field totally cancels the direct-current magnetic field.

10. The method for measuring the magnetic field according to claim 8, comprising the steps of:
adjusting the direct-current external magnetic field such that the direct-current external magnetic field partly cancels the direct-current magnetic field; and
determining the value of the direct-current magnetic field in the direction of the vibration originating from the specimen, based on at least two values of the direct-current external magnetic field and intensities of frequency modulation corresponding to the at least two values of the direct-current external magnetic field.

11. The method for measuring the magnetic field according to claim 8, comprising the step of:
either (a) calibrating the alternating-current magnetic field such that intensity of the frequency modulation becomes zero, or (b) calibrating the alternating-current magnetic field such that the intensity of the frequency modulation gets closer to zero.

12. The method for measuring the magnetic field according to claim 8, comprising the step of:
scanning a surface of the specimen one-dimensionally, two-dimensionally, or three-dimensionally by means of the probe.

* * * * *